UNITED STATES PATENT OFFICE.

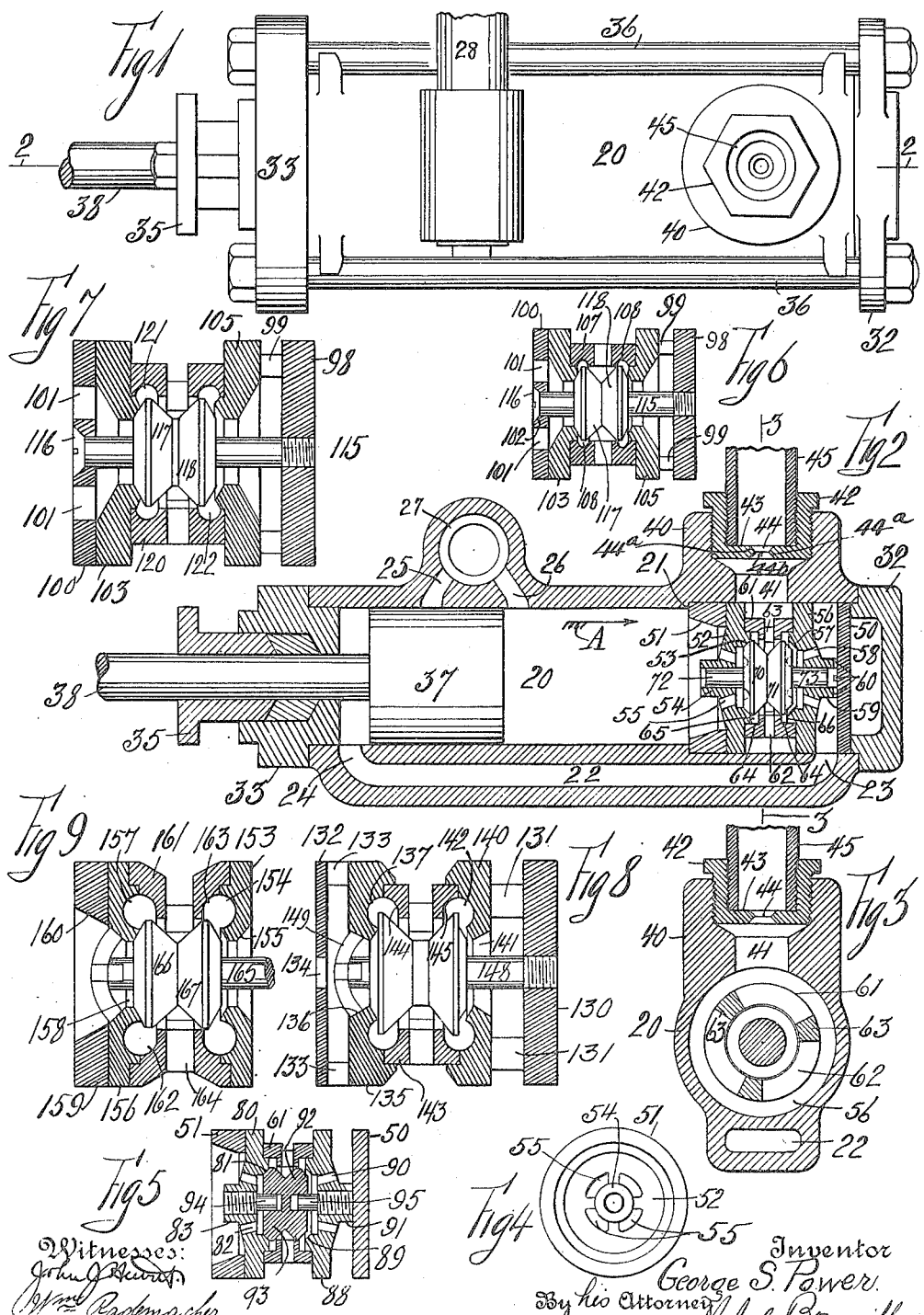

GEORGE S. POWER, OF NUTLEY, NEW JERSEY.

FLUID-MOVED VALVE.

1,264,856.  Specification of Letters Patent.  Patented Apr. 30, 1918.

Application filed July 2, 1914. Serial No. 848,583.

*To all whom it may concern:*

Be it known that I, GEORGE S. POWER, a citizen of the United States, and a resident of Nutley, in the county of Essex and State of New Jersey, have invented certain new and useful Improvements in Fluid-Moved Valves, of which the following is a specification.

This invention relates to a fluid moved valve, and is an improvement of my Letters Patent for fluid moved valve, dated July 21st, 1914, numbered 1,104,131. The invention is particularly applicable to a cylinder with a reciprocating piston. The organization of the invention consists in part of a valve with a pair of members each of which comprises at least one conical frustum, the surfaces of which are reversed to each other. The valve is impelled by the effect of the flow of the driving fluid through the contracted area between its outer periphery and the walls of the chamber in which it reciprocates, in conjunction with an annular feed cavity for supplying the requisite amount of the driving fluid at the requisite pressure.

In the accompanying drawings some of the various forms in which the invention may be carried out are exemplified.

Figure 1 represents the top plan view of a cylinder and its appurtenances with the invention incorporated therewith; Fig. 2 shows a section of Fig. 1 on the line 2, 2 with a part elevation; Fig. 3 is a section of Fig. 2 on the line 3, 3; Fig. 4 represents an end view of an element, Fig. 5 shows a sectional view of a slight modification; Figs. 6, 7, 8 and 9 show sectional views of further modifications.

Referring to Figs. 1 to 4 inclusive, a cylinder is indicated at 20, counterbored at 21 and formed with the longitudinal steam or supply port 22, having the inlet end 23 and the outlet end 24. Exhaust ports 25, 26 connect with the exhaust cavity 27, and the latter has connected thereto the exhaust pipe 28. A back cylinder head is shown at 32, and a front cylinder head 33 has formed therewith a stuffing box with the gland 35. Bolts 36 connect the cylinder heads and hold them in place on the cylinder 20. A piston 37 in said cylinder has extending therefrom the piston rod 38, which extends through the stuffing box and gland 35 in the usual manner. A boss 40 has formed therewith the driving fluid supply port 41. A reducer 42 with the lower end wall 43 having the opening 44 is in threaded engagement with the boss 40. The opening 44 is formed with the beveled surfaces $44^a$ which produce the annular edge $44^b$. A steam or fluid inlet pipe 45 is in threaded engagement with the said reducer 42. The reducer 42 enables the use of a large inlet pipe like 45, to reduce the friction in said pipe to a minimum. At the same time various reducers like 42 may be employed which each have openings 44 of a different size, to suit driving fluids of different kinds. The beveled surfaces $44^a$ of the opening 44 enables the fluid which passes therethrough to only come in contact with the annular edge $44^b$ of said opening.

A valve cage or chest is located in the counter-bore 21 of the cylinder, and comprises the end plate 50 and end ring 51. A valve seat plate 52 with the valve seat 53 abuts against the ring 51, and has formed therewith the guide sleeve 54 and the ports 55. A similar valve seat plate is indicated at 56 with the valve seat 57, ports 58 and guide sleeve 59. The plate 56 abuts against the end plate 50, and has formed therewith the slots 60, which latter prevent cushioning of the valve to be described.

Between the said valve seat plates is located a separator ring 61 with the central annular cavity 62 and connecting lugs 63. The said ring is shouldered on its outer surfaces as indicated at 64, forming with the valve seat plates 52 and 56, the annular feed cavities 65 and 66. A valve is shown with the reversed positioned double conical frustums 70 and 71. The frustum 70 has formed therewith the valve spindle 72, and the frustum 71 has formed therewith the valve spindle 73. The outer face of the frustum 70 coacts with the valve seat 53, and the frustum 71 coacts with the valve seat 57.

To operate the form of the invention described the driving fluid, steam or air, enters the inlet pipe 45, passes through the opening 44, and thence enters the supply port 41. The fluid then enters the annular cavity 62, and fills the feed cavities 65 and 66. When the moving elements are located, as indicated in Fig. 2, the fluid is fed from the cavity 62, and enters the annular space or contracted area, between the separator ring on its end adjacent to the head 32 and the inner face of the double frustum 71, thereby moving the valve in the direction of the arrow A to seat on the valve seat 57. The horizontal components of the impulses of the driving fluid as they enter said contracted area impinge upon the inner face of the double frustum 71 which augments the movement of the valve. The valve principally receives its movements from the effect of the flow of the fluid through the contracted area between its outer periphery and the adjacent edge of the separator ring. The impingement of the fluid on the inner face of the frustum of the valve with the effect of the flow of the fluid over its edge forces the valve in the direction of the arrow A. The object of the frustum shaped valve is to increase the area between said frustum and the separator ring 61 as the valve moves to its seat. The movements of the valve do not depend upon the compression in the cylinder 20, and which is conclusive from a trial of the apparatus. At the same time, a sufficient amount of the fluid has flown through the ports 58, and the longitudinal port 22, to drive the piston 37 in the direction of the said arrow A. When the piston 37 passes the exhaust port 25 the fluid escapes through the cavity 27 and pipe 28. After the piston 37 has made its stroke in the direction of the arrow A, the fluid from the feed cavity 64 enters the annular space between the frustum 70 and the valve seat 53, enabling the fluid to pass through the ports 55. It then enters the cylinder 20 to drive the piston in a direction opposite to the arrow A. When the piston is located in the position shown in Fig. 2, the fluid escapes from the cylinder by way of the exhaust port 26, cavity 27 and exhaust pipe 28.

Referring to Fig. 5 a modfication is shown with the same end plate 50, end ring 51 and separator ring 61. A valve seat plate 80 has formed therewith the valve seat 81, ports 82 and threaded sleeve 83. A valve seat plate 88 has formed therewith the valve seat 89, ports 90 and threaded sleeve 91. A valve with reversed positioned double conical frustums 92, 93 coacts with the valve seats 89 and 81. A valve spindle 94 is in the threaded engagement with the sleeve 83 and a valve spindle 95 is in threaded engagement with the sleeve 91. The valve spindles carry the valve having the conical frustums 92, 93 the said valve having suitable cavities for the spindles 94 and 95.

In Fig. 6 the invention is shown with the end plate 98 having the projecting lugs 99, an end plate 100, with ports 101 and the central opening 102. A valve plate 103 with a central port abuts against the end plate 100. A valve plate 105 with a central port abuts against the lugs 99. A separator ring 107 with the feed cavities 108 is located between the valve plates 103 and 105. The said feed cavities tend to direct the driving fluid in directions at right angles to valve spindle to be described before entering the annular space between the valve to be described and the valve seats with which the valve coacts. A valve spindle 115 is threaded in the plate 98 and has a head 116 that engages the opening 102. A valve with the reversed positioned double conical frustums 117 and 118 rides on the valve spindle 115.

In Fig. 7 the same elements are shown as described for Fig. 6, excepting that the separator ring 120 has feed cavities 121 and 122 which are formed to feed the driving fluid in directions perpendicular to the outer faces of the valve with the reversed positioned double conical frustums 117 and 118.

In Fig. 8 the invention is shown with an end plate 130 having the projecting lugs 131, and end plate 132, with the projecting lugs 133 and central port 134. A valve plate 135 abuts against the lugs 133, and has formed therewith the central opening 136 and the curved feed cavity 137. A valve plate 140 abuts against the lugs 131 and has formed therewith the central port 141 and the curved feed cavity 142. A separator ring 143 is located between the valve plates 135 and 140, and has formed therewith the feed cavities 144 and 145. The cavities 137 and 144 together form a practically circular annular feed cavity, and the cavities 142 and 145 form a similar circular annular feed cavity. A valve spindle 148 is in threaded engagement with the plate 130 and has formed therewith a crow foot 149 that engages the opening 136. A valve similar to the one described for Fig. 6 rides on the spindle 148. The feed cavities described continually contain the outer circumferential edges of said valve.

In Fig. 9 the construction of elements of the invention is quite similar to those described for Fig. 8. An end plate similar to 130 not shown is used. A valve plate 153 has formed therewith the feed cavity 154 and central port 155. A valve plate 156 has formed therewith the feed cavity 157 and the central port 158. An end plate 159 is shown with the central port 160. A separator ring 161 with the feed cavities 162 and 163 and central port 164 is located between the valve plates. A valve spindle 165 similar to 148 supports the valve with the reversed positioned double conical frustums 166 and 167.

The modification just described differs from that shown in Fig. 8 in that the feed cavities are larger and further separated from the circumferential edges of the valve.

It will be noted that the end plate 50, end ring 51, valve seat plates 52, 56 and the separator ring 61 are detachable one from the other, so that they can easily be cleaned and repaired or replaced, and the same may be stated for the elements of the modifications of the invention.

Having described my invention what I desire to secure by Letter Patent and claim is:

1. In an apparatus of the character described, the combination of a cylinder, a valve chest for the cylinder, valve seat plates for the valve chest, a separator ring having a central cavity located between the valve seat plates and forming annular feed cavities with the valve seat plates, and a valve coacting with the valve seat plates.

2. In an apparatus of the character described, the combination of a cylinder, a valve chest for the cylinder, a pair of valve seat plates each having ports, a guide sleeve for the valve, a separator ring having a central cavity located between said valve seat plates and forming feed cavities with said valve seat plates, and a valve with a pair of valve spindles, the latter being guided in said guide sleeves.

3. In an apparatus of the character described, the combination of a cylinder, a valve chest, for the cylinder, detachable valve seat plates for the valve chest, a detachable separator ring having a cavity located between the valve seat plates and forming annular feed cavities with the valve seat plates and a valve coacting with the valve seat plates.

4. In an apparatus of the character described, the combination of a cylinder with a counter-bore at one end thereof, a valve chest in said counter-bore comprising a detachable end ring and end plate, a pair of detachable oppositely positioned valve seat plates between the end ring and end plate, a detachable separator ring having an annular cavity between the valve seat plates and forming feed cavities therewith and a reciprocating valve coacting with the valve seat plates.

Signed at the borough of Manhattan in the county of New York and State of New York, this 24th day of June, A. D. 1914.

GEORGE S. POWER.

Witnesses:
A. A. DE BONNEVILLE,
JOHN JESSICH.